US005757630A

United States Patent [19]

Lesea

[11] Patent Number: 5,757,630
[45] Date of Patent: May 26, 1998

[54] CONTROL CIRCUIT WITH IMPROVED FUNCTIONALITY FOR NON-LINEAR AND NEGATIVE RESISTANCE LOADS

[75] Inventor: Ronald A. Lesea, Redwood Drive, Calif.

[73] Assignee: Electronic Lighting, Inc., Menlo Park, Calif.

[21] Appl. No.: 523,537

[22] Filed: Sep. 5, 1995

[51] Int. Cl.$^{6}$ .............................. H02M 1/12; H05B 41/29

[52] U.S. Cl. .............................................. 363/39; 315/219

[58] Field of Search .................................. 363/21, 39, 65; 323/222, 207, 283; 315/291, 219; 307/260

[56] References Cited

U.S. PATENT DOCUMENTS

| | | | |
|---|---|---|---|
| 4,591,963 | 5/1986 | Retotar | 363/17 |
| 4,672,300 | 6/1987 | Harper | 323/222 |
| 4,733,104 | 3/1988 | Steigerwald et al. | 307/260 |
| 5,109,185 | 4/1992 | Ball | 323/207 |
| 5,287,040 | 2/1994 | Lestician | 315/291 |
| 5,315,214 | 5/1994 | Lesea . | |
| 5,315,215 | 5/1994 | Lesea . | |
| 5,345,164 | 9/1994 | Lesea . | |
| 5,426,349 | 6/1995 | Nilssen | 315/219 |
| 5,477,112 | 12/1995 | Lesea | 315/219 |

OTHER PUBLICATIONS

Brochure entitled "Current Mode PWM Controller", by Unitrode Integrated Circuits of Merrimack, NH, UC1842/3/4/5/; UC2842/3/4/5 and UC3842/3/4/5; Jun. 1993, pp. 5-179-5-185.

*Primary Examiner*—Stuart N. Hecker
*Assistant Examiner*—Rajnikant B. Patel
*Attorney, Agent, or Firm*—Burns, Doane, Swecker & Mathis, LLP

[57] ABSTRACT

The present invention is directed to providing a load control circuit for non-linear or negative-resistance loads, such as gaseous-discharge lamps, having improved cost-effective control and control. In accordance with exemplary embodiments, a controlled start feature is provided which is relatively cost-effective to implement and manufacture. Further, by reducing the complexity and costs associated with such functionality, additional functionality can be provided without substantially increasing the cost of the control circuit.

16 Claims, 10 Drawing Sheets

CONTROL CIRCUIT WITH IMPROVED FUNCTIONALITY FOR NON-LINEAR AND NEGATIVE RESISTANCE LOADS

BACKGROUND OF THE INVENTION

1. Field of the Invention

The present invention relates generally to the control of non-linear or negative-resistance loads, such as electronic ballasts used to control gaseous-discharge lamps. Those skilled in the art will appreciate that the invention is not limited to loads used to generate light, but can be used in connection with any non-linear or negative resistance load.

2. State of the Art

Gaseous-discharge lamps generate light when an electric current passes through a gaseous medium. Because gaseous-discharge lamps have a negative resistance (that is, resistance decreases with increasing current supply), a ballast is used for providing current limiting control.

A typical ballast uses a transformer for voltage conditioning. Such voltage conditioning includes provision of a high potential for starting the gaseous discharge lamp, such as a fluorescent lamp, by ionizing gas in the lamp to a plasma state. The transformer can include a winding for energizing the lamp, and separate filament windings for providing filament heating.

Although ballasts for controlling gaseous-discharge lamps are known, conventional ballasts are relatively limited in their functionality. The high number of lamps and associated ballasts which are required in a typical environment (such as an office building) requires the use of low cost ballasts, and consequently prohibits incurring the higher costs associated with enhanced functionality. That is, complex circuitry required to implement functionality deemed desirable for gaseous-discharge lamps renders inclusion of additional functionality in the ballasts cost-prohibitive. Conventional ballasts and gaseous-discharge lamps are therefore relatively limited in terms of the functionality they provide.

For example, conventional ballasts typically do not include a controlled start function by which a relatively low voltage is provided to the filaments during a predetermined time period for preheating prior to high voltage ionization and starting of the lamp. Where such a feature is provided, the complex circuitry required renders any cost-effective enhancement of the ballast's functionality impractical.

Accordingly, it would be desirable to reduce the complexity of circuitry used to implement traditional functions of a load control apparatus and thereby render such functionality more cost-effective. Further, it would be desirable to provide additional functionality for improving overall operation of a ballast without significantly increasing the cost associated with manufacturing the ballast.

SUMMARY OF THE INVENTION

The present invention is directed to providing a load control circuit for non-linear or negative-resistance loads. In accordance with exemplary embodiments, a cost-effective controlled start feature is included in the control circuit. In addition to reducing the complexity associated with the controlled start feature, additional functionality is provided without substantially increasing the cost of the control circuit.

Exemplary embodiments include relatively cost-effective circuitry for implementing numerous functions. Such functionality includes: (1) feed-forward functionality for controlling a ratio of peak current to root mean square current during a power modulation cycle (that is, reducing crest factor of a negative resistance load); (2) cost-effective controlled start functionality; (3) lamp current detection functionality for determining when one or more lamps burn out; (4) improved efficiency by providing deadband between signals used to drive the switches of a high frequency chopper; (5) high line-voltage detection for disabling operation in response to high line-voltage conditions; (6) over-temperature detection for disabling operation in response to ambient temperature conditions; (7) lamp filament connection detection for inhibiting operation in response to poor or missing lamp filament connections; and (8) dimming functionality for providing cost-effective lamp illumination control.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
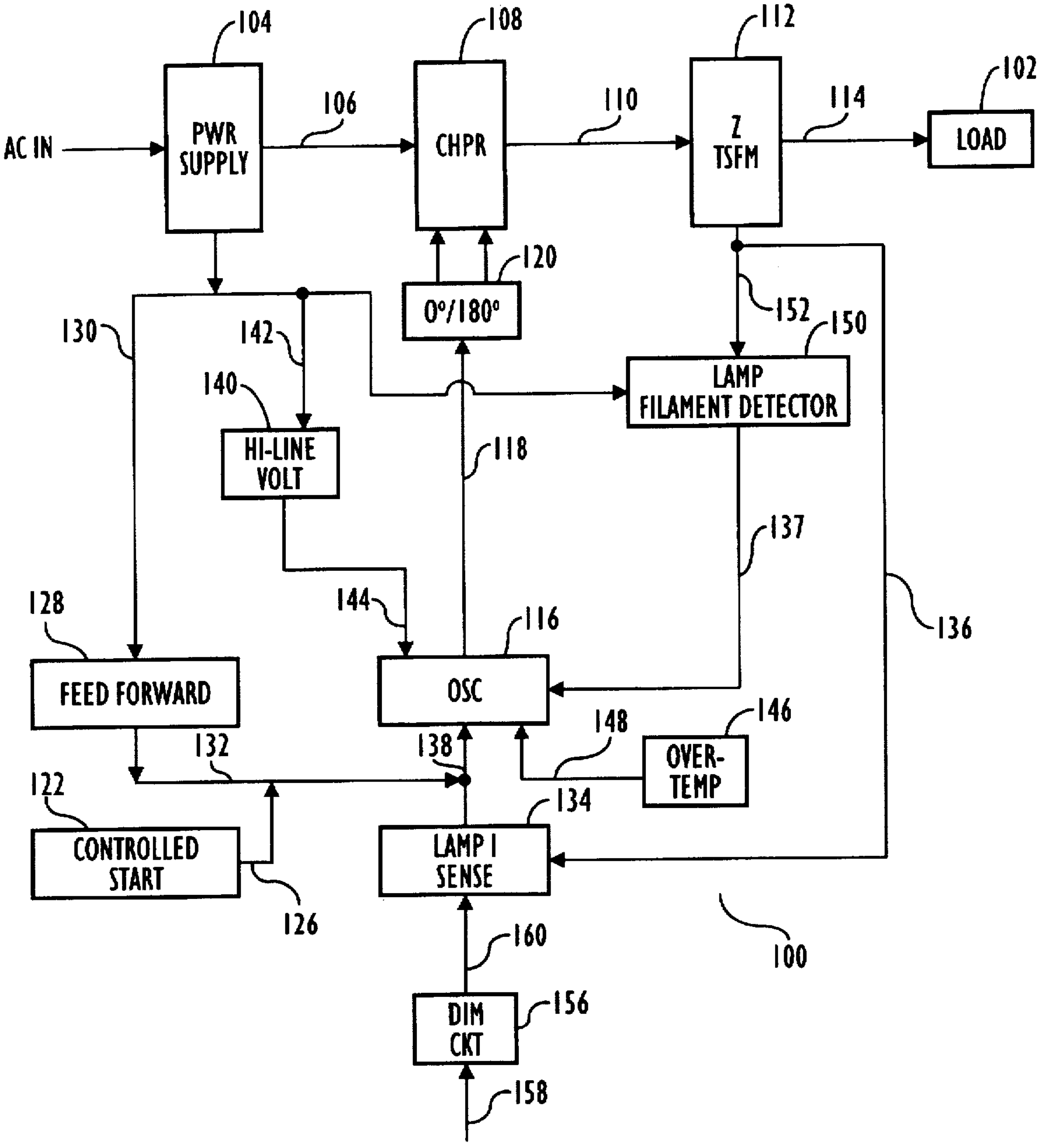
FIG. 1 is a block diagram of an exemplary embodiment of the present invention for use in connection with a three lamp load.

FIG. 1 illustrates a block diagram of an apparatus for controlling a non-linear or negative-resistance load, such as one or more gaseous discharge lamps. For purposes of the following discussion, the non-linear or negative-resistance load can be considered to include any number of fluorescent lamps. In FIG. 1, such a load is generally designated 102, and an apparatus for controlling the load is designated 100.

The control apparatus 100 includes means for providing a modulated DC power supply having a periodic ripple. In the FIG. 1 embodiment, power supply 104 receives an AC input and produces a modulated DC supply with a time varying ripple component $V_r$, that varies from approximately 80 volts to approximately 160 volts. In accordance with exemplary embodiments, power supply 104 can be considered a power source as described in Applicant's U.S. Pat. No. 5,345,164, entitled "Power Factor Corrected DC Power Supply" issued Sep. 6, 1994, the contents of which are hereby incorporated by reference in their entirety.

An output from the power supply 104 is supplied via line 106 to a means for controlling the DC supply. In accordance with exemplary embodiments, the control means can be considered an inverting means represented as a chopper 108, formed as a half-bridge or totem-pole structure. Such a chopper can include first and second switches, such as transistors which are operated 180° out of phase with one another.

The output from chopper 108 is input via line 110 to an impedance transforming network 112. Such a network can be considered similar to that described in Applicant's co-pending U.S. application Ser. No. 08/053,144, filed Apr.

27, 1993 and entitled "Ballasting Network and Integral Trap". Output power from the impedance transform network 112 is supplied via line 114 to the non-linear or negative-resistance load 102 which, for purposes of the exemplary FIG. 1 embodiment, includes three fluorescent lamps.

In accordance with exemplary embodiments, the FIG. 1 apparatus further includes means for providing a drive signal to control the supply of high frequency AC power to the load. In the FIG. 1 embodiment, the drive signal providing means includes an oscillator 116 which can, for example, be the known oscillator chip UC3844 which is of the family described in the brochure "UC1842/3/4/5; UC2842/3/4/5; UC3842/3/4/5" available from Unitrode Integrated Circuits of Merrimack, N.H., the contents of which are hereby incorporated by reference in their entirety.

Chopper 108, oscillator 116 and impedance transforming network 112 provide a power transfer function whereby as frequency of the oscillator is increased, output power to the load 102 is decreased. Of course, those skilled in the art will appreciate that any transfer function can be used in accordance with the present invention. For example, the transfer function can be selected such that as frequency output of the oscillator decreases, output power to the load also decreases.

The oscillator 116 can produce a single-ended output which is supplied via line 118 to a phase drive 120. The phase drive produces two out-of-phase drive signals, such as signals which are 180° out of phase with one another, for the half-bridge totem-pole structure of the chopper 108.

In accordance with exemplary embodiments of the present invention, means are provided for adjusting frequency or pulse width of the drive signal output from oscillator 116. Such an adjusting means supplies a voltage signal input to the oscillator 116 via line 138 during a voltage charging cycle, and includes a primary current supply for establishing the rate of change of the voltage signal input. A controlled start function 122 is included whereby a supplemental current supply is provided for modifying (for example, increasing) the rate of change of the voltage signal input to the oscillator 116. The supplemental current can be used to adjust the frequency or pulse width of the drive signal during a predetermined time period to provide a cost-effective, timed, controlled start feature.

In the exemplary FIG. 1 embodiment, the controlled start 122 increases the frequency of the drive signal supplied by the oscillator 116 to the chopper 108 during a pre-illumination start-up period. As a result, cathodes included in the gaseous-discharge lamps of the load 102 can be pre-heated with a relatively low voltage prior to ionization illumination. After the predetermined start-up period, the supplemental current is eliminated such that the charging rate of the voltage signal input to oscillator 116 decreases, thereby increasing voltage to the load 102 and initiating illumination. While those skilled in the art will appreciate that controlled start features have been used in the past, a controlled start in accordance with exemplary embodiments of the present invention, as will be described in further detail with respect to FIG. 2, can be implemented in an efficient and cost-effective manner.

In addition to providing a cost-effective controlled start feature, embodiments of the present invention include additional functionality. For example, exemplary embodiments include means for coupling the modulated DC power supply from power supply 104 (including the periodic ripple component), to the oscillator 116 for controlling the frequency or pulse width of the drive signal in response to the periodic ripple of the power supply output. This coupling of the power supply and the oscillator can be used to compress the peak load current resulting from the modulated DC power supply.

In the exemplary FIG. 1 embodiment, coupling of the power supply and the oscillator is implemented by a feed-forward device 128. The feed-forward device 128 responds to the periodic ripple of the modulated DC power supply 104 via line 130 to control the frequency or pulse width of the drive signal from oscillator 116 via line 132, and thereby compress peaks in the power supplied from the chopper 108 to the load 102. As a result, a reduced ratio of peak current to root mean square current of the power supplied to the load can be achieved, thereby decreasing the crest factor in power supplied to the load 102.

The FIG. 1 apparatus further includes a means, responsive to current supplied to the load 102, for producing a lamp current detection signal as an enable signal input to the drive signal providing means. As illustrated in FIG. 1, such a feature is implemented by a lamp current sensing device 134 which responds via line 136 to current output from the impedance transforming network 112 to the load 102 for providing an enable signal via line 138 to the oscillator 116.

The lamp current sensing device responds to the absence of current through one or more lamps to shut down the oscillator 116 and thereby shutoff any other lamps which remain illuminated. Those skilled in the art will appreciate that such a function can be modified to respond to the outage of any number of lamps in the load 102 to shut off the remaining lamps. For example, it may be desirable to only enable the oscillator 116, in the case of a three lamp load, when at least two of the three lamps are present and operating properly. Alternately, it may be desirable to only enable the oscillator 116 when all three of the lamps in the load 102 are present and operating properly.

In accordance with the present invention, the lamp current sensing device provides an enable signal to oscillator 116 during the pre-illumination start-up period established by the controlled start 122. Otherwise, the lamp current sensing device would inhibit the lamps from becoming illuminated during the pre-illumination start-up period. Therefore, in addition to providing a voltage input signal to the oscillator 116 for increasing the frequency or pulse width of the drive signal during the predetermined start-up period, current is also supplied by the controlled start 122 to the lamp current sensing device 134 during a period of time which can be equal to or greater than the predetermined start-up period.

In accordance with further exemplary embodiments of the present invention, power dissipation and unreliable operation within the switches of chopper 108 can be reduced by providing a phase drive 120 which outputs first and second switching signals, respectively. The first and second switching signals are out-of-phase with one another by, for example, 180°. In accordance with the present invention, the 180° phase drive 120 is modified to include means for establishing a deadband between the switching off of the first switch and the switching on of the second switch. Such a feature ensures that one transistor of the half-bridge or totem-pole structure in the chopper will have switched-off with a relatively fast decay prior to a delayed switch-on of the other switch. As a result, it can be assured that the two transistors of the half bridge or totem-pole structure will not conduct at the same time.

Further, the FIG. 1 apparatus includes means responsive to the modulated DC supply for providing a high-voltage detection signal and means for inhibiting the drive signal output from oscillator 116 when the high voltage detection signal exceeds a predetermined threshold. Such a feature is illustrated in FIG. 1 as a high line-voltage detection device 140. The high line-voltage detection device 140 is responsive to the output from power supply 104 via line 142, and provides an inhibit signal to the oscillator 116 via line 144 when a high line-voltage condition is detected.

In accordance with another feature of the FIG. 1 apparatus, a means responsive to ambient temperature within the apparatus is included to provide a thermal detection signal. For this purpose, the drive signal providing means includes means for inhibiting the drive signal when the thermal detection signal exceeds a predetermined threshold. Such a feature is illustrated in FIG. 1 as an over-temperature detection device 146 which responds to ambient temperature to provide an inhibit signal via line 148 to the oscillator 116. When the temperature detected by the over-temperature detection device exceeds a predetermined threshold, an inhibit signal to the oscillator prevents the oscillator from supplying the drive signal via line 118 to the chopper 108.

The FIG. 1 apparatus further includes means responsive to a level of current through the lamp filaments to inhibit the drive signal providing means during initial lamp start up. More particularly, a lamp filament connection detector 150 is provided which detects the presence of resistance of the lamp filaments via line 152. Those skilled in the art will appreciate that gaseous-discharge lamps, such as fluorescent lamps, can be inserted into the socket improperly and yet still produce light. When filament contacts of a lamp are improperly placed into their socket, the lifetime of such lamps is reduced considerably. Such improper connections are typically unnoticed by installers of the lamps, and result in premature burn-out.

However, in accordance with exemplary embodiments of the present invention, the lamp filament connection detector 150 detects when a lamp filament connection is missing from its socket, or when a lamp has been improperly placed in its socket; that is, placement which will produce light but which will not produce cathode filament heating. When the DC current detected via line 152 indicates an improper resistance at the lamp filaments, an inhibit signal is provided via line 137 from the lamp filament connection detector 150 to the oscillator 116 to inhibit the drive signal from being provided via line 118 to the chopper 108.

The FIG. 1 apparatus further includes means for summing a signal proportional to a current supply to the load with a current proportional to an external source to produce a dimming control signal. The oscillator 116 is responsive to the dimming control signal to reduce power supplied to the load. Such a feature is generally illustrated in FIG. 1 as the dimming circuit 156, which responds to an input dimming command signal via line 158.

The dimming circuit 156 produces a current output signal which, via line 160, can be supplied to the lamp current sensing device 134 where it is summed with a signal proportional to a current from the load. The summed current is then input via a line 138 to the oscillator 116. Thus, when dimming of the lamps associated with load 102 is desired, increased current is supplied via line 160 from the dimming circuit 156 to the oscillator 116. During a period of normal operation, this current will alter the frequency or pulse width of the drive signal produced by oscillator 116. As mentioned previously, increased frequency of the oscillator 116 results in reduced power output from the impedance transforming network 112 to the load 102, thereby resulting in decreased light output from the load 102.

Figures 1, 2A:
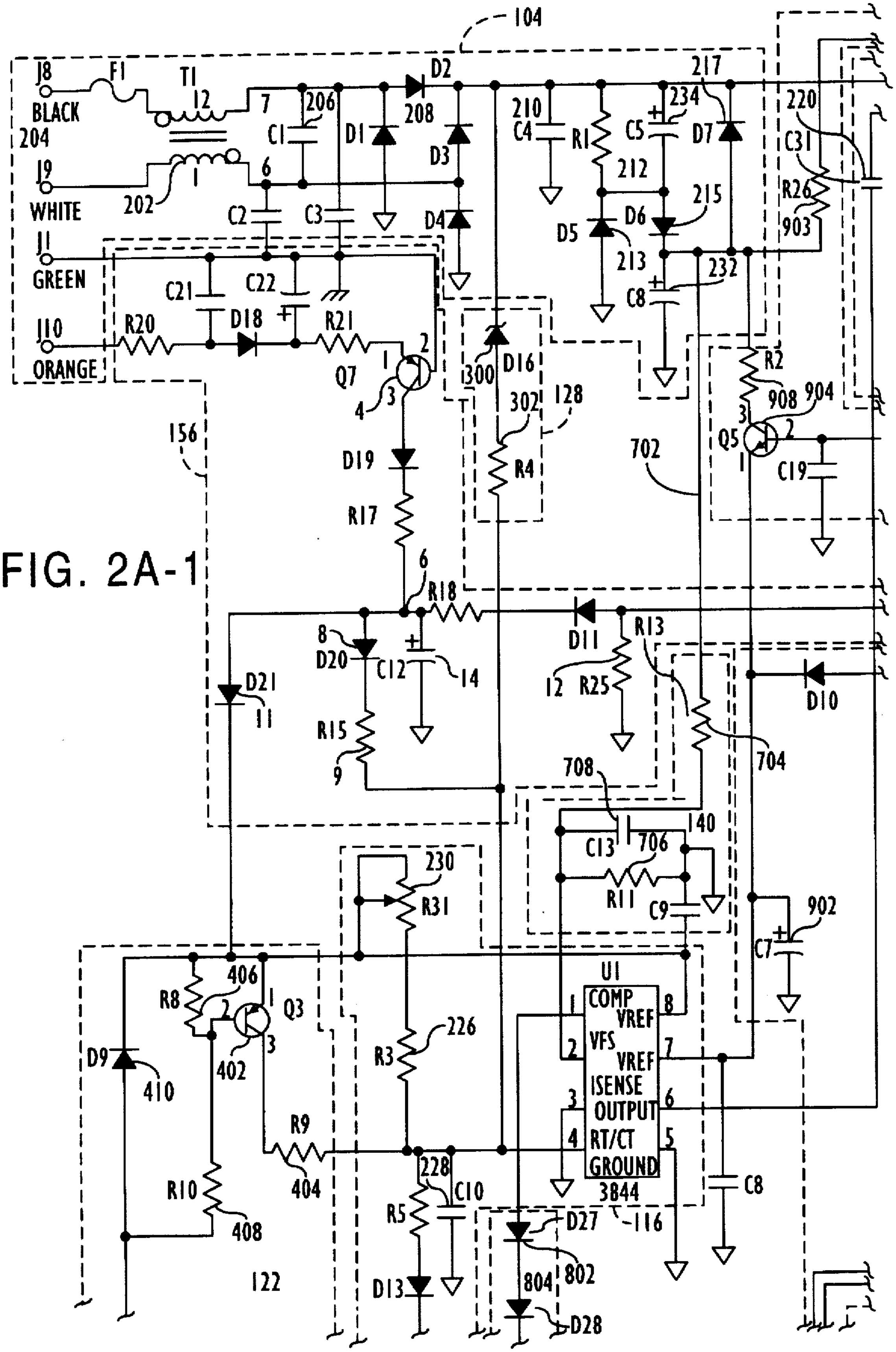
FIGS. 2A–2B are a more detailed schematic drawing of the FIG. 1 embodiment.

Each of the features described above with respect to FIG. 1 will now be described in greater detail with respect to the schematic diagrams of FIGS. 2 and 5. FIGS. 2A—2B represent an exemplary embodiment of the present invention used in connection with a load that includes three gaseous-discharge lamps. FIG. 5 illustrates an exemplary embodiment of the present invention for use in connection with a load 102 that includes two gaseous discharge lamps.

Figures 2, 2A:
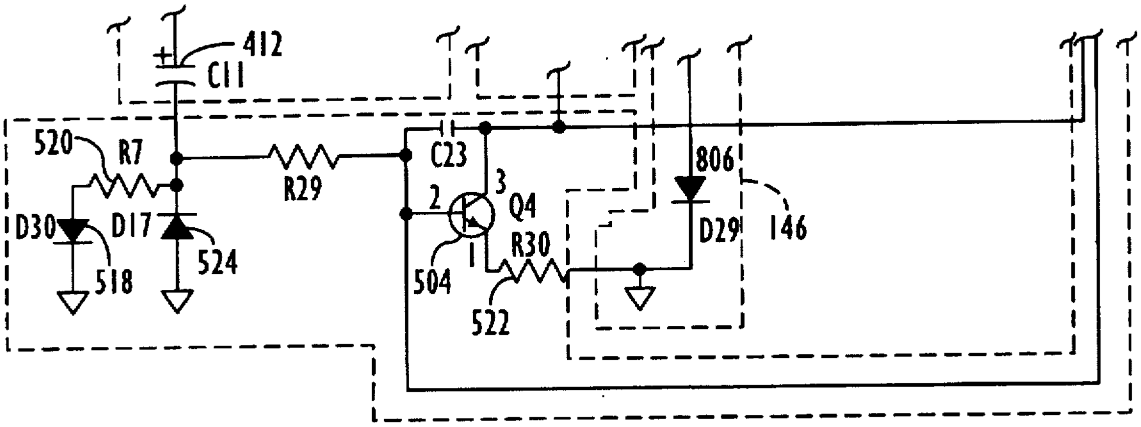
Figure 2B:
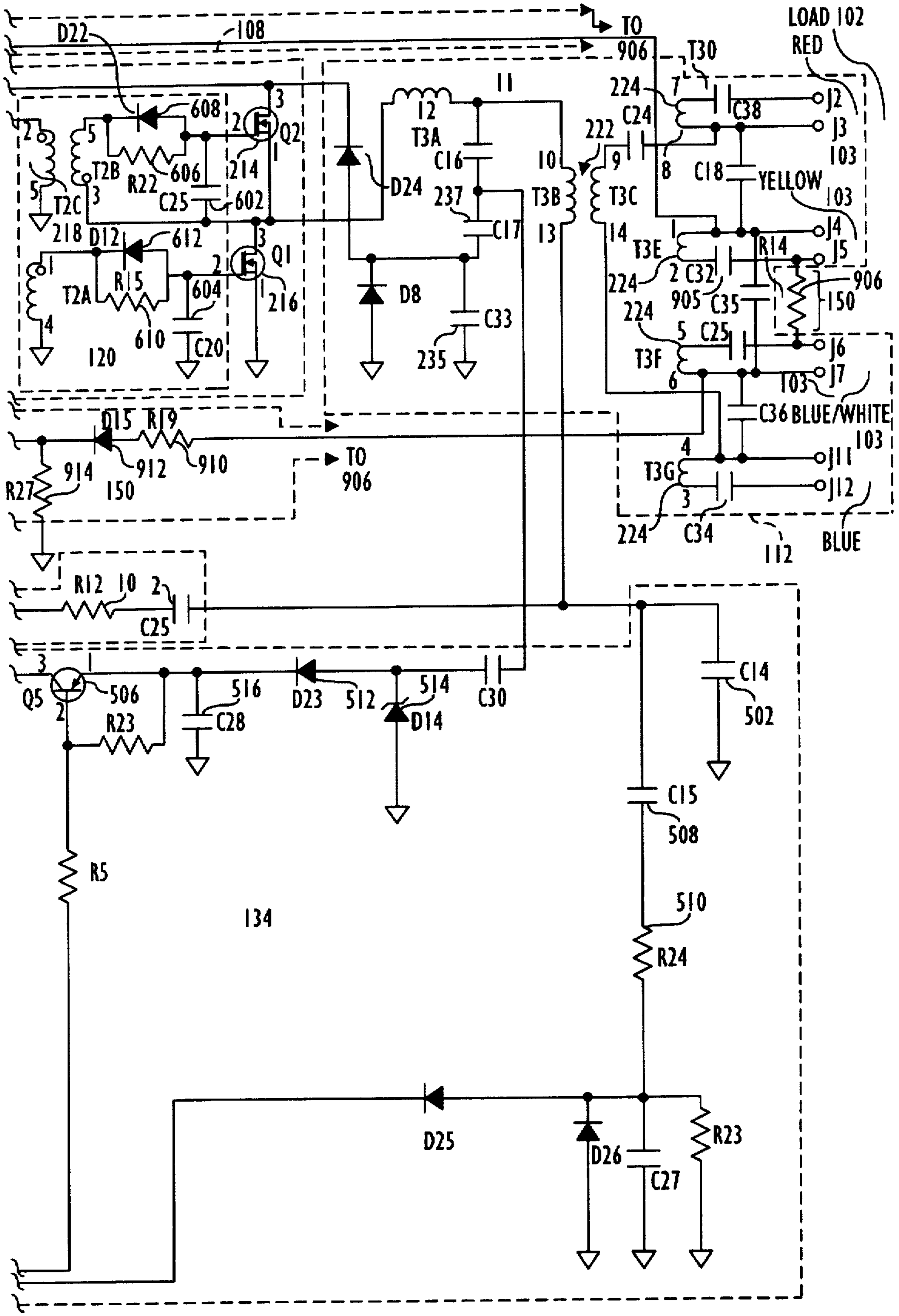

Each of the specific features described with respect to FIG. 1 is included within each of FIGS. 2 and 5, with the exception of a dimming feature, which is not illustrated in FIG. 5. Components of FIG. 1 have been provided similar labels in FIG. 5, and the modifications associated with use of a two-lamp configuration in FIG. 5 relative to the three lamp configuration of FIGS. 2A–2B will be readily apparent to those skilled in the art. Accordingly, those skilled in the art will appreciate that specific values identified for the components for the FIG. 5 schematic would be suitable for use with the specific components of FIG. 2, with any necessary changes being readily apparent to those skilled in the art.

As illustrated in FIGS. 2A–2B, the power supply 104 is similar to that of the aforementioned U.S. Pat. No. 5,345,164. The power supply 104 includes a transformer 202 which receives an AC voltage input via AC input lines 204. The AC input can be considered a typical 60 hertz sinusoidal waveform, which is applied to a shunt capacitor 206 via a series inductance of the transformer 202. The voltage across capacitor 206 is rectified via a bridge 208 which includes four diodes. The exemplary power supply 104 of FIG. 2 further includes a noise reduction capacitor 210 as a high frequency bypass for the chopper. Current steering diodes 213, 215 and 217 are provided in conjunction with filter capacitors 232 and 234. With this configuration, capacitors 232 and 234 are charged in series and discharged in parallel. A resistor 212 is a bleeder resistor coupled in parallel with capacitor 234. The voltage across capacitor 232 serves as a low voltage supply for oscillator 116 via the lamp filament detector 150. The voltage across capacitor 232 also serves as a voltage supply for the high-line voltage detector circuit 140.

The chopper 108 of FIG. 2 receives an output from the power supply 104 and includes a half-bridge or totem-pole structure. More particularly, the chopper 108 includes first and second switches represented as a first transistor 214 and a second transistor 216. The transistors 214 and 216 are driven by a single-ended output from the oscillator 116 that is provided via line 118 and phase drive 120 to the chopper 108.

As illustrated in FIG. 2, the phase drive 120 includes a transformer 218 having a primary and two secondaries, with the secondaries being connected to produce drive signals for the transistors 214 and 216 which are 180° out-of-phase with one another, respectively. A DC blocking capacitor 220 is included between the output oscillator 116 and the transformer primary.

The chopped output of modulated power supply 104 is supplied to the load 102 via the impedance transforming network 112. The impedance transforming network includes a transformer 222 and a plurality of filament windings 224. The impedance transforming network further includes a plurality of inductances and capacitances for establishing the impedance transformation and for limiting the current supplied to the filament windings and the load. The impedance transforming network also includes rectifying diodes connected to a junction of two network capacitors $C_{33}$ and $C_{17}$, labelled 235 and 237, respectively.

As mentioned previously, the oscillator 116 used to provide a drive signal to chopper 108 can include a standard oscillator chip. Those skilled in the art will appreciate that any oscillator can be used which provides a variable frequency or pulse width. In accordance with exemplary embodiments wherein the UC3844 oscillator is used, the drive signal supplied to the chopper 108 can be varied by varying the frequency output of the oscillator. To vary the frequency of the oscillator, an RC network represented as resistor 226, potentiometer 230 and timing capacitor 228 can be included at the input pin 4 of the oscillator. The frequency output from pin 6 on line 118 from oscillator 116 is controlled by varying the rate at which the timing capacitor 228 is charged. As the charging rate of capacitor 228 increases, output frequency of the oscillator 116 increases.

In operation, as the frequency of the oscillator 116 is increased, the drive signal frequency supplied via line 118 to chopper 108 varies. As increased frequency switching of the transistors 214 and 216 in the chopper 108 occurs, power supplied to the load 102 via the impedance transforming network 112 decreases. Thus, the impedance transforming network provides a current limiting function with the impedance transformation and gain being sensitive to frequency. On the contrary, when the charging rate of timing capacitor 228 in oscillator 116 is decreased, increased power is supplied to the load 102.

Those skilled in the art will appreciate that while an exemplary embodiment of the chopper has been described as receiving a single-ended output from the oscillator which is then divided into multi-phase drive signals, any chopper can be used as chopper 108. For example, the chopper can be driven by double-ended outputs from an oscillator (that is, an oscillator which provides two outputs instead of the single output described with respect to the UC3844 oscillator). Further, the chopper can be a push-pull type of inverter, or any other frequency inverter means.

Having discussed basic features of the FIG. 1 circuit in detail with respect to the FIG. 2 and FIG. 5 schematics, a more detailed discussion will now be provided of a simplified controlled start feature in accordance with exemplary embodiments of the present invention. Further, a more detailed discussion of the additional functionality mentioned with respect to FIG. 1 will be provided.

1. Feed-Forward

As mentioned previously, a feed-forward feature of the present invention reduces crest factor in power supplied to the load by reducing the ratio of peak current to root mean square current (for example, preferably to a ratio less than 1.7). The feed-forward provides a signal of the power supply 104 to decrease power output to the load when the ripple voltage from the power supply 104 rises above a predetermined threshold.

In accordance with exemplary embodiments, feedforward device 128 can be implemented with at least one device having non-linear gain, such as Zener diode 300 of FIG. 2A. Zener diode 300 is provided in series with a resistor 302 between the output of power supply 104 and the oscillator frequency control pin (that is, pin 4 of the UC3844 oscillator chip).

As described previously, the output from the power supply 104 includes a DC supply with a periodic ripple (for example, 120 Hertz ripple) that varies from approximately 80 volts to approximately 160 volts for a standard 60 Hertz AC line input to the power supply 104. In accordance with exemplary embodiments, when this ripple rises above a threshold, such as a 120 volt threshold of Zener diode 300, increased current is supplied via the resistor 302 to the timing capacitor 228 of the oscillator 116. As a result, the capacitor 228 charges more rapidly to the threshold voltage which thereby increases the frequency from the oscillator 116.

Thus, during a voltage peak of power supply 104, the output from the oscillator 116 is increased in frequency to thereby increase the switching frequency of the transistors 214 and 216 in the chopper 108. As a result of the impedance transforming network 112, the power supplied to the load is reduced. The relatively simplistic architecture of the FIG. 1 feed-forward (that is, the use of a single Zener diode in series with a resistor) renders implementation of this feature extremely cost-effective and therefore, feasible for inclusion in bulk produced lamp ballast circuits.

Those skilled in the art will appreciate that a cost-effective implementation of a feed-forward function in accordance with the present invention is not limited to the specific architecture illustrated in FIG. 2A. Rather, other non-linear gain devices, such as a transistor, can be used in place of the Zener diode to achieve the feed-forward function of FIG. 2.

Figure 3:
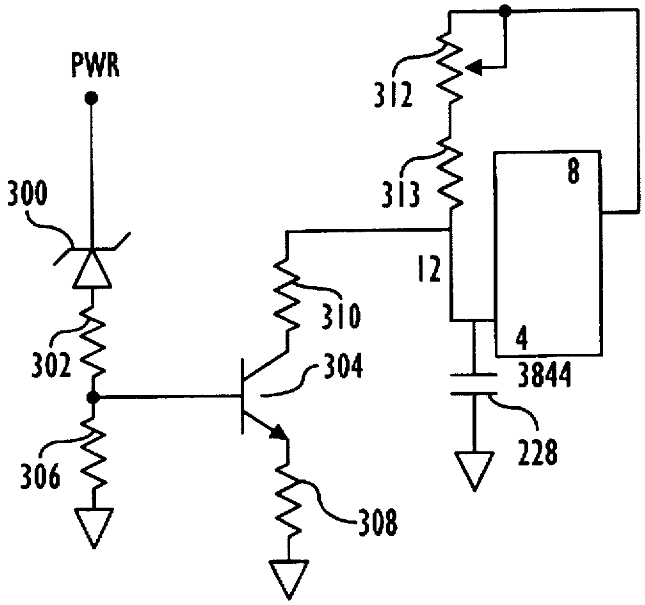
FIG. 3 is an alternate exemplary embodiment of a feed-forward circuit.

FIG. 3 illustrates an alternate feed-forward embodiment for an oscillator in which an increased current supply input decreases the frequency output. The FIG. 3 embodiment includes the Zener diode 300 and the resistor 302. The oscillator 116 includes the UC3844 oscillator chip with the timing capacitor 228 connected between input pin 4 and ground.

To implement the FIG. 3 feed-forward, current from the power supply is provided to the base of a transistor 304 via Zener diode 300 and resistor 302. The transistor 304 includes a base resistor 306 for stability, an emitter resistor 308 for desensitizing the circuit and a collector resistor 310. The collector of the transistor 304 and the resistor 310 are connected to input pin 4 of the oscillator UC3844 chip. The voltage reference pin 8 of the oscillator chip is also tied back to pin 4 via a variable resistor 312 and a series resistance 313.

In accordance with the exemplary FIG. 3 embodiment, as increased current is supplied to the base of transistor 304, increased current sinks to ground via the collector-emitter junction of transistor 304. The charging rate of capacitor 228 therefore decreases, thereby decreasing the output frequency of the oscillator chip.

2. Controlled Start

The controlled start 122 as illustrated in FIG. 2A includes a switch represented as a pnp transistor 402 for switching current through a resistor 404 to the timing capacitor 228. Such a feature provides variable control of the charging rate for the signal at pin 4 of the oscillator 116.

As illustrated in FIG. 2A, the controlled start provides a supplemental current which, in conjunction with a primary current source provides increased current to timing capacitor 228 to increase the rate of its charging cycle and increase frequency output of the oscillator 116. Because the voltage of the timing capacitor 228 reaches a threshold necessary for triggering the voltage threshold at pin 4 of the oscillator more quickly, frequency of the drive signal from oscillator 116 is increased.

The controlled start 122 includes a resistor 406 connected between the transistor base and a reference voltage of, for example, 5 volts present at pin 8 of the UC3844 chip for ensuring that the transistor 402 remains off at high temperatures. This resistor ensures that the current multiplied by the gain of the transistor does not leak through the resistor 404 and result in a modified supplemental current being supplied to the timing capacitor 228 when the transistor 402 is heated during operation. Also included in the controlled start 122 are a base resistor 408 for providing timing in conjunction with capacitor 412, and a diode 410 which is used to reset the charge on capacitor 412 such that the capacitor 412 is discharged prior to initiation of a controlled start feature.

In operation, the potentiometer 230 and the resistor 226 of the oscillator 116 establish a base current for the capacitor 228 and thus, constitute the primary current source for the capacitor 228. During the predetermined start-up period defined by the charging rate of capacitor 412 and a switching point of the transistor 402, current is supplied to the base of transistor 402 and supplemental current flows to capacitor 228 through resistor 404. Once the capacitor 412 has charged, transistor 402 is starved of base current such that supplemental current is no longer supplied to the capacitor 228. The output frequency of oscillator 116 therefore decreases to provide increased power to the load 102 via the impedance transforming network 112.

That is, after a predetermined time delay of, for example, 0.5 to 0.75 seconds, the frequency or (pulse width) output from the oscillator can be decreased (increased) by eliminating the supply of supplemental current. The output voltage supplied to the load will therefore increase to a voltage sufficient to ionize the lamps. In accordance with exemplary embodiments, an initial frequency of the oscillator-output used to preheat cathodes of the gaseous-discharge lamps can be approximately 10 to 15% greater than the normal operating frequency which is used during lamp illumination. Instant-start problems typically associated with electronic rapid start ballasts for gaseous-discharge lamps can thereby be avoided to prolong the life of the lamps. The FIG. 2 schematic therefore represents a relatively cost-effective implementation of a controlled start feature.

In accordance with an exemplary embodiment of the present invention the voltage transition from the start-up voltage to the operating voltage of the lamps is gradual. The transistor 402 has finite gain and has a finite base-emitter junction potential; that is, resistor 406 ensures that transistor 402 shuts off when the voltage available at the junction between resistor 406 and 408 is below the base emitter voltage needed to maintain transistor 402 in an on state. Thus, as the capacitor 412 fully charges, thereby starving base current from the transistor 402, the transistor enters its linear region but does not shutoff immediately. As a result, a finite time period exists during which the transistor modifies the amount of supplemental current supplied to the capacitor 228. The change in frequency from an initial high frequency to a normal operating low frequency therefore occurs during a portion of the start-up period; that is, the transition period is defined by a constantly changing frequency over a predetermined period time of, for example, 0.1 seconds.

Exemplary embodiments of the invention therefore reduce or eliminate transients in the output frequency supplied to the chopper 108. That is, transients which would otherwise occur if the switching between the frequency used for start-up and the frequency used for normal operation occurred instantaneously are reduced or eliminated. By selecting appropriate values for the resistors 404, 406, 408 and capacitor 412 (for example, values as shown in the two lamp embodiment of FIG. 5), the interval over which the output frequency of the oscillator 116 changes from the start-up frequency to a normal operating frequency can be varied to reduce transients to an acceptable amount.

In summary, the cost-effective controlled start 122 includes: capacitor 412 which is charged from the reference voltage on the chip via resistor 408 during a predetermined start-up period; and an adjustable gain switch such as transistor 402 which is controlled (that is, gated both on and off) by the capacitor 412. Further, controlled start 122 includes means for selecting the adjustable gain, such as the resistors 404, 406, 408 and the capacitor 412, to establish a predetermined rate of change of the drive signal frequency or pulse width at the output of oscillator 116.

3. Lamp Current Sensing Device

As illustrated in the exemplary FIG. 2A–2B embodiment, the lamp current sensing device 134 includes a capacitor 502 (FIG. 2B) for generating a voltage responsive to current from the impedance transforming network and for triggering a switch, such as transistor 504. When lamp current exists, the capacitor 502 has a high frequency voltage responsive to lamp current and transistor 506 is gated on via transistor 504. That is, AC voltage at capacitor 502 is applied across the series combination of capacitor 508 and resistor 510, and is rectified by diode D25 to turn on transistor 504. Transistor 504, once gated on, provides base current is to transistor 506. A low voltage DC power source is provided for transistor 506 and includes a Zener diode 514 connected to an emitter of pnp transistor 506 via a diode 512. A capacitor 516 is connected between the emitter of transistor 506 and ground.

To properly operate, the $V_{cc}$ voltage supply pin 7 of the UC3844 chip must be supplied with typically 20 milliamps of current. Note that a capacitor 902, which is connected from pin 7 to ground, must therefore charge to a predetermined operating level to enable oscillator operation. If lamp current is lost, transistor 504 is gated off, thereby gating off transistor 506 and cutting off the supply of operating current to the input $V_{cc}$ pin 7 of the UC3844 chip. The UC3844 chip becomes disabled when the voltage from capacitor 902 discharges from, for example, a 16 volt normal operating voltage to an 11 volt threshold.

Exemplary embodiments of the invention establish an interrelationship between aspects of the controlled start 122 and the lamp current sensing device 134. This interrelationship is provided to ensure that the oscillator 116 is enabled by the lamp current detection circuit during the start-up period which occurs prior to illumination of the lamps (that is, prior to existence of lamp current).

In accordance with the present invention, the supplemental current provided to the base of transistor 402 of the controlled start to increase the drive signal frequency or pulse width output by oscillator 116 during start-up is also supplied to transistor 504 of the lamp current sensing device 134. This current supply to transistor 504 triggers the lamp current sensing device during the start-up period when no lamp current exists, and thereby enables the oscillator pin 7 via transistor 506. $V_{BE}$ temperature compensation for the transistor 504 is provided via use of a diode 518, a resistor 520 and a resistor 522, with diode 524 being used in conjunction with diode 410 of the controlled start 122 for resetting the capacitor 412 of the controlled start. Once the start-up period ends and lamps included in the load 102 start, lamp current is monitored via capacitor 502 in parallel with the serial combination of capacitor 508 and resistor 510 to provide base current to the transistor 504.

To ensure that the lamp sensing device enables the oscillator 116 during the entire start-up period, base current must be provided to the transistor 504 for a period of time which is established by capacitor 412 of the controlled start and transistor 504 of the lamp current sensing device. This period of time should be equal to or, preferably greater than, the start-up period established by capacitor 412 and the transistor 402 in the controlled start 122. For example, base current should be sufficient to maintain transistor 504 on for a period of 1.5 seconds, while transistor 402 is maintained on for the period of, for example, 0.5 to 0.75 seconds during a start-up period.

To achieve different periods of time, the base current to the transistors 402 and 504 can be set with different switching characteristics. For example, the base current for the transistors 402 and 504 can be independently set to establish the different time periods. The base currents can be independently set by choosing values for resistor 520, which bleed current from the base of transistor 504, relative to a value of resistor 406, which bleeds current from the base of transistor 402.

In summary, the lamp current sensing device 134 includes a capacitor 502 which has a voltage that is responsive to the lamp current for enabling the oscillator 116 subsequent to the start-up period. Further, the lamp current sensing device includes a lamp control switch, represented as transistor 504, for providing an enable signal input to the oscillator 116. Thus, if one or more lamps is defective or is missing from its socket, the energy control apparatus will not continuously supply high voltage to a defective lamp. Rather, the energy control apparatus will be disabled within a predetermined time period subsequent to expiration of the lamp start-up period.

4. 180° Phase Drive with Deadband

As described previously, the chopper 108 is driven by a 180° phase drive 120 which receives the single-ended output from oscillator 116. As illustrated in FIGS. 2A—2B, the secondaries of the transformer 218 are connected to produce drive signals for transistors 214 and 216 which are 180° out of phase.

The drive signals are connected to transistors 214 and 216 via a deadband establishing means which includes first and second capacitors 602 and 604, respectively, connected to bases of the transistors 214 and 216. The capacitors 602 and 604 are provided, in an exemplary embodiment, to increase the effective input capacitance (that is, gate-to-source capacitance) of the transistors 214 and 216. These capacitors also decrease the known Miller effect due to reverse drain-to-gate feedback of the exemplary field effect transistors 214 and 216. Those skilled in the art will appreciate that if the transistors 214 and 216 have a relatively small Miller effect and a relatively large input capacitance, capacitors 602 and 604 can be eliminated.

A resistor 606 and diode 608 are connected in parallel between the gate of transistor 214 and the first out-of-phase secondary of the transformer 218. A resistor 610 and diode 612 are similarly connected between the gate of transistor 216 and the in-phase secondary of transformer 218.

Figure 4A:
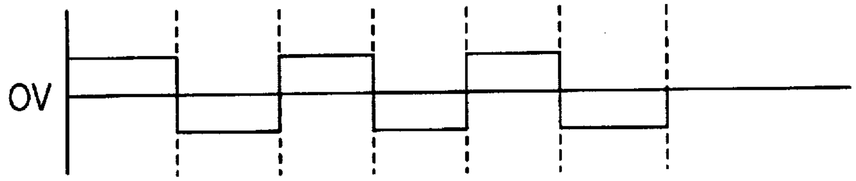
FIGS. 4A–4D are drive waveforms associated with an exemplary chopper in the FIG. 2B schematic.

By including a deadband establishing means, current transients which would otherwise be produced by switching between transistors of the half-bridge can be reduced or eliminated. FIGS. 4A and 4C show the 180° out of phase drive signals produced by the first and second secondaries of transformer 218 as square wave pulses. These pulses can be centered around zero volts and vary between plus/minus 15 volts.

Figure 4B:
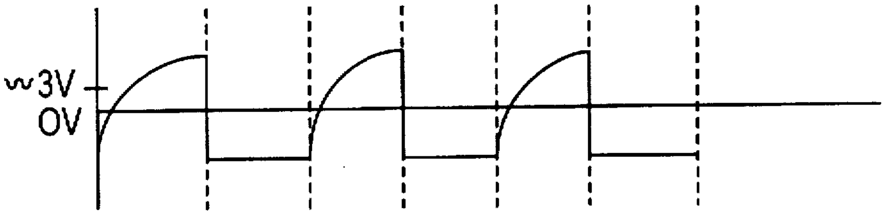
Figure 4C:
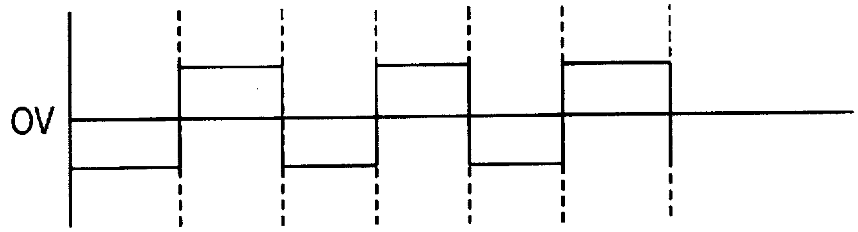
Figure 4D:
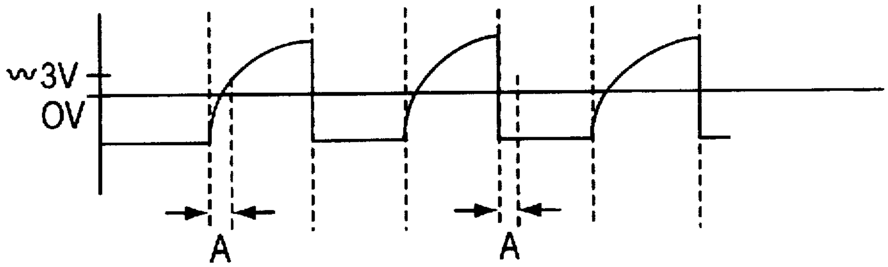
Figure 5A:
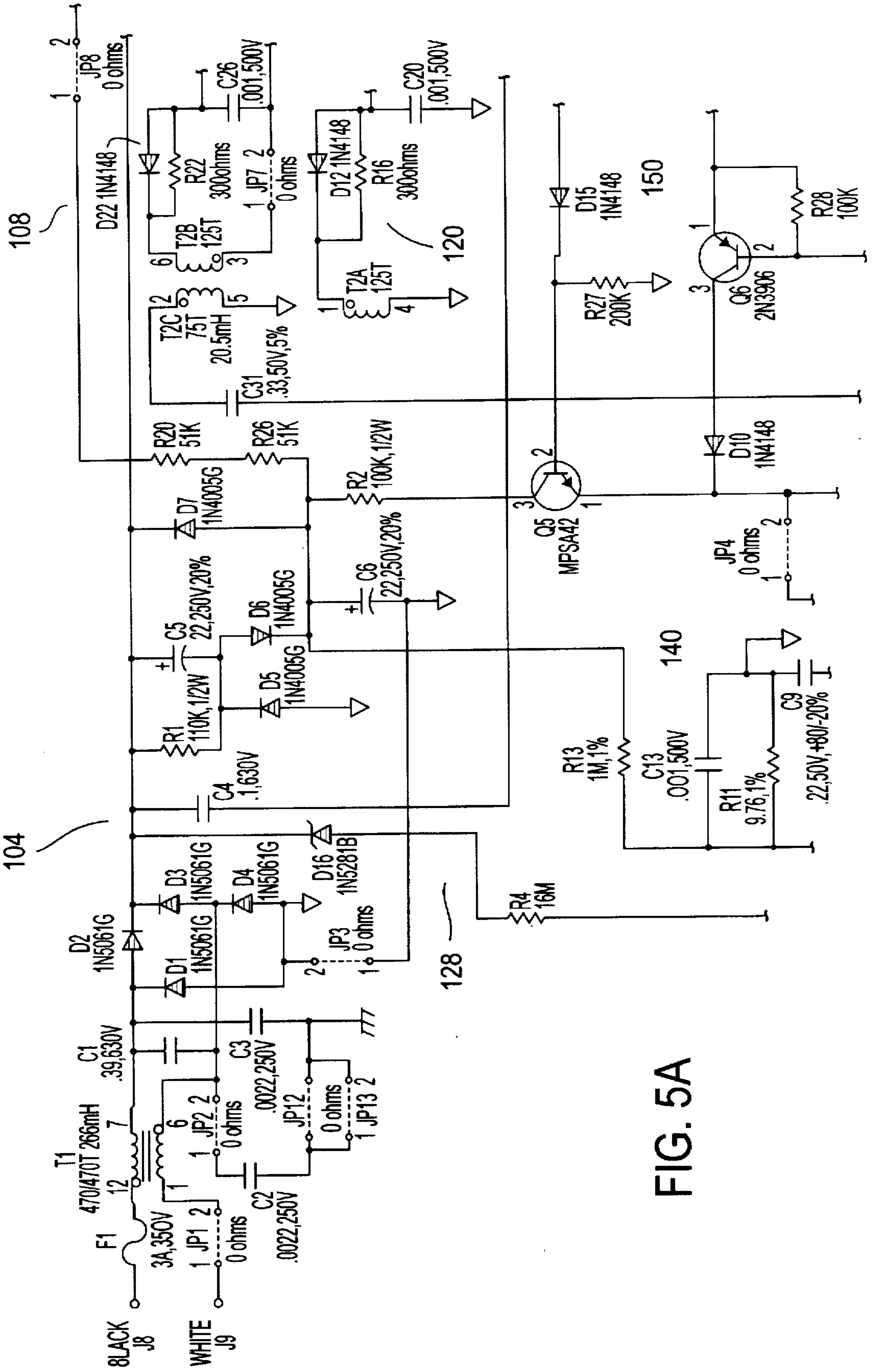
FIG. 5 is an alternate exemplary embodiment of the present invention for use in connection with a two lamp load.
Figure 5B:
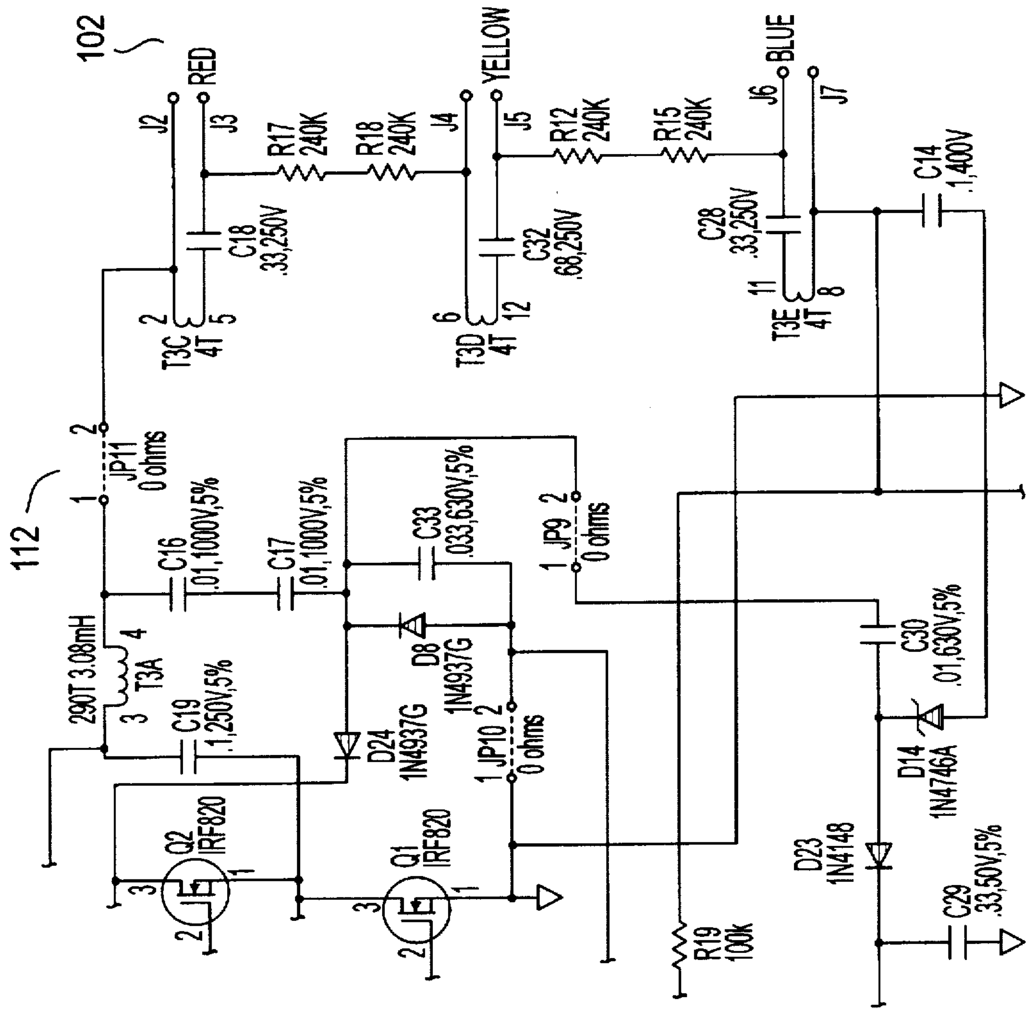
Figure 5C:
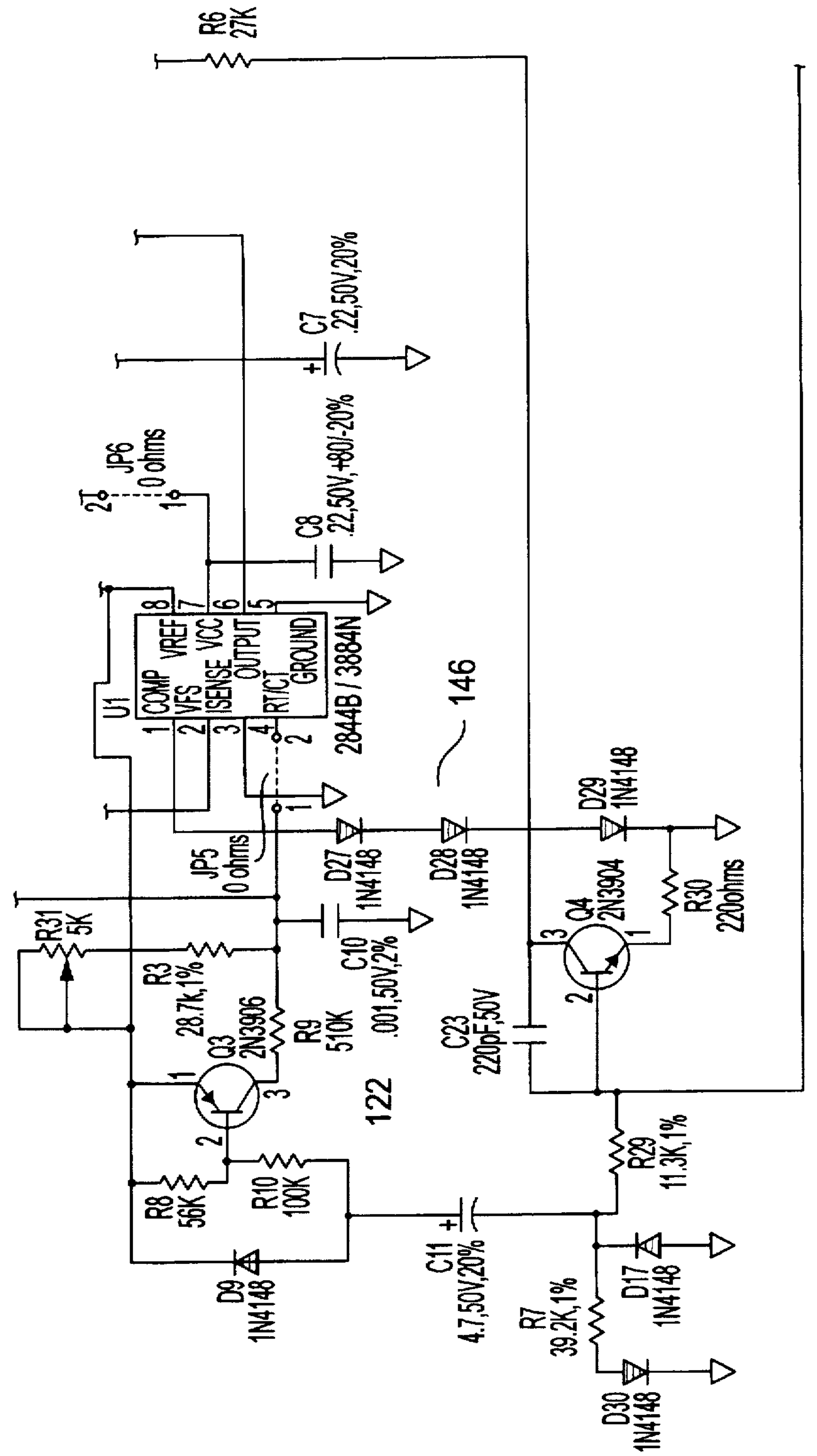
Figure 5D:
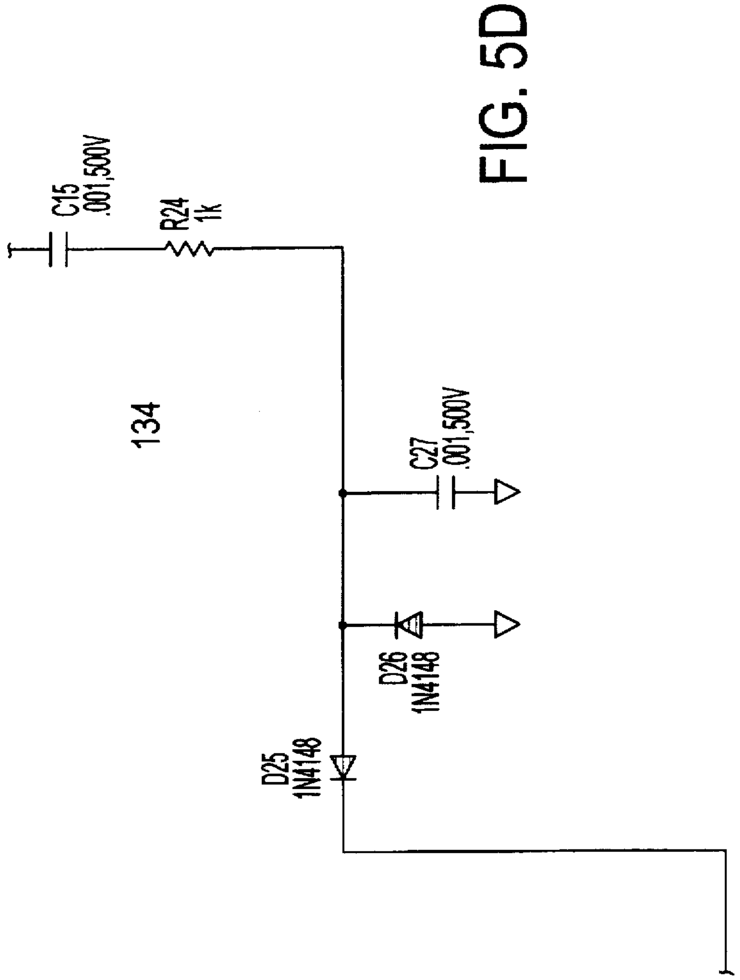

Due to the use of the deadband establishing means, the square wave drive signals are reshaped to include slow rise times (the rise times being dictated by the time constants of resistors 606 and 608, in conjunction with the input capacitance of transistors 214 and 216 and capacitors 602 and 604), and to include relatively fast falling edges as illustrated in FIGS. 4B and 4D. The waveform of FIG. 4B can be considered the drive signal to transistor 216 while the waveform of FIG. 4D can be considered the drive signal to transistor 214.

Due to the switching points of the transistors 214 and 216, the relatively slow rise time of the waveforms of FIG. 4B and 4D results in a delayed turn-on of the transistors 214 and 216. For example, referring to the FIG. 4D drive waveform for transistor 214, and considering that the transistor 214 will be gated on when the voltage at its gate passes through approximately three volts, a deadtime can be considered to exist between the turn-off of transistor 214 (as represented by the falling edge in FIG. 4B), and the point in time at which the rising edge of the waveform in FIG. 4D passes through approximately three volts. This deadtime is represented in FIG. 4 as deadtime "A".

Due to this relatively cost-effective circuit configuration, it can be assured that one transistor in the half-bridge of chopper 108 will be turned off before the other transistor is gated on. As a result, transients which may otherwise occur due to overlapping turn-on and turn-off of the transistors 214 and 216 can be reduced or eliminated.

5. High Line-Voltage Detection

Due to the cost-effective manner in which features of an energy control apparatus for driving gaseous-discharge lamps included in the load are provided, additional functionality can be achieved such as the high line-voltage detection circuit 140. As illustrated in FIG. 2A, the high line-voltage detection circuit 140 can include means for inhibiting the oscillator 116 from producing the drive signal when the high voltage detection signal exceeds a predetermined threshold.

In accordance with the exemplary FIG. 2 embodiment, the high line-voltage detection circuit 140 is responsive to the power supply 104 via a line 702. Resistors 704 and 706 provide a voltage divider circuit for dividing the voltage received from the power supply 104. The resistors 704 and 706 are connected across capacitor 232 of a ripple reduction circuit in the power supply 104. Because the capacitor 232 in conjunction with the capacitor 234 of the ripple reduction circuit are charged in parallel and discharged in series, a voltage across capacitor 232 is relatively constant (that is, reduced ripple) and therefore is suitable for use in monitoring high line-voltage conditions.

The high line-voltage detection circuit 140 of FIG. 2 further includes a capacitor 708 connected in parallel with resistor 706 to provide noise suppression and to provide a high frequency filter for an input pin of the oscillator 116. Where the oscillator 116 is a UC3844, the high line-voltage output can be supplied to pin 2, which represents a voltage feedback input to a non-inverting input of an operational amplifier. In accordance with an exemplary operation, when the voltage at pin 2 is greater than approximately 2.5 volts, the oscillator chip is disabled.

Operation of the exemplary high line-voltage detection circuit 140 in accordance with the FIG. 2 embodiment is therefore as follows. The threshold of the voltage divider established by the resistors 704 and 706 is such that when the monitored voltage of power supply 104 rises to a predetermined threshold level (for example 125% of its DC value), the divided voltage applied from capacitor 232 across the resistor 706 is equal to 2.5 volts. As a result, the UC3844 chip of oscillator 116 will disable the drive signal output from oscillator 116 on pin 6, and thereby disable the supply of power to the load 102. For example, if the voltage across the capacitor 232 rises to a value proportional to 125% of the lower 80 volt voltage swing of the power supply, (for example, approximately 100 volts), then the divided voltage across the resistor 706 will be approximately 2.5 volts, thereby disabling the oscillator 116.

Those skilled in the art will appreciate that the exemplary embodiment described with respect to FIG. 2 for the high line-voltage detection circuit is by way of illustration only, and the exemplary embodiments of the present invention are not limited to the specific circuitry of FIG. 2. For example, rather than shutting the oscillator 116 down in response to a high line-voltage detection, the drive signal output from oscillator 116 can be adjusted to reduce power supplied to the load 102 when high line-voltage detection occurs.

Thus, those skilled in the art will appreciate that any means for either shutting off the oscillator 116 or modifying the output of the oscillator 116 can be used in accordance with exemplary embodiments of the present invention. For example, in an alternate embodiment, a current sink of greater than 50 mA to the voltage reference pin 8 of the UC3844 can also be used to shut the oscillator off. Alternately, an input voltage to pin 3 of the UC3844 can be used to modify output from the oscillator 116 and reduce power supplied to the load 102.

6. Over-Temperature Detection

In accordance with exemplary embodiments, an over-temperature detection capability is also used to disable the oscillator 116 when ambient temperature exceeds a predetermined threshold. In accordance with exemplary embodiments, such over-temperature detection includes a means responsive to ambient temperature within the apparatus for providing a thermal detection signal. Further, the over-temperature detection can include means, within the drive signal providing means (represented as oscillator 116) for inhibiting the drive signal output from oscillator 116 when the thermal detection signal exceeds a predetermined threshold. For example, the thermal detection signal providing means can include a plurality of non-linear devices, such as diodes 802, 804 and 806, connected in series to the inhibiting means represented as pin 1 of the UC3844 chip in oscillator 116.

In operation, if the energy control apparatus, such as a ballast for gaseous-discharge lamps, becomes too hot for any reason (for example, greater than 120° C.), the oscillator is disabled. To achieve such operation, the negative temperature coefficient of the silicon diodes is used. As ambient temperature rises, the forward voltage drop of the series connected diodes decreases. For example, the negative temperature coefficient of the diodes 802, 804 and 806 can be approximately 2.0 to 2.2 mV per ° C., depending on the current (that is, for zero current, the temperature coefficient of the diodes is approximately 2 mV per ° C.). For each degree of temperature rise, the voltage drops by approximately 2.0 mV due to the negative temperature coefficient mentioned above.

Assuming that the voltage drop across each of the diodes is 0.55 volts, the three series connected diodes result in a 1.65 voltage drop across pin 1 of the UC3844 oscillator chip such that this chip remains enabled. However, assuming a 2.0 to 2.2 mV per ° C. negative coefficient, the oscillator 116 would be disabled if ambient temperature rises to approximately 120°. That is, for each degree of temperature rise, the voltage drops by approximately 2.0 mV per diode, or a total of 6.0 mV for the three series connected diodes.

Because the normal drop across the three diodes is 1.65 volts, a drop of approximately 0.65 volts to the 1.0 volt disabling threshold voltage at pin 1 of the oscillator chip will result when the temperature rises approximately 100° C. (that is, from an ambient temperature of approximately 20° C. to overheat ambient temperature of approximately 120° C.). A 100° C. rise in temperature will result in a voltage decrease across the three series connected diodes of: (100° C.×0.006 volts per ° C.=0.600 volts). Note that 1.650 volts −0.600 volts is approximately 1 volt, the reduced voltage necessary to disable the oscillator 116 via pin 1.

Those skilled in the art will appreciate that exemplary embodiments of the present invention are not limited to the specific circuitry illustrated in FIG. 2. For example, rather than using the diodes, any semiconductor junction means having a negative temperature coefficient can be used including, for example, transistors. For example, the base-emitter junction of a transistor can be used in place of a diode junction, with a base of the transistor being tied back to the collector to provide a reduced forward voltage drop.

By providing an over-temperature shut down capability, the energy control apparatus for a lamp which includes gaseous-discharge lamps can be preserved in the event of over-temperature conditions, thereby prolonging its life and avoiding any need to replace the ballast.

7. Lamp Filament Connection Detection

Those skilled in the art will appreciate that the sockets designated 103 in FIG. 2 receive the prongs of, for example, a fluorescent bulb. For a three-lamp configuration, two lamps are connected to the yellow and two lamps are connected to the blue-white pin. One filament pair is connected to the red pin, two filaments are connected in parallel to the yellow pins, two filaments are connected in parallel to the blue-white pins and one filament pair is connected to the blue pin. When the lamps are improperly installed, it is possible that one filament may not be properly connected to a pin (for example, the fluorescent bulb was improperly rotated into the socket thereby missing one or more pins). Such improper connections will be detected with the lamp filament connection detector 150, and inhibit operation at the time power is initially applied to lines 204.

In accordance with exemplary embodiments, a lamp filament connection detector 150 as illustrated in FIGS. 2A–2B includes means responsive to a level of current through the filaments to inhibit the drive signal providing means represented as oscillator 116. In accordance with exemplary embodiments, this inhibiting means includes at least one DC isolating capacitor (such as capacitor $C_{32}$, labelled 905) connected between a filament winding 224 and the load 102. Further, the inhibiting means includes a switch (such as transistor 904) which is responsive to current through at least one filament for enabling and disabling the oscillator 116.

To enable the oscillator, current is supplied to the base of the transistor 904 via a resistor $R_{26}$, (labelled 903), a resistor 906 connected between filament windings, a resistor 910 and a diode 912. For an exemplary current gain of 20 at transistor 904, approximately 50 μA through the resistor 906 will be sufficient to gate on transistor 904, thereby charging capacitor 902 and enabling the oscillator 116. A resistor 914 is provided in parallel with the base emitter junction of transistor 904 to maintain transistor 904 off when leakage currents occur due to high ambient temperatures.

In operation, at least one mA must be supplied to the $V_{cc}$ pin 7 of the UC3844 chip to enable oscillator 116. If one or more lamp filament connections included in the load is improperly inserted in a socket of the fixture, current through resistor 906 is insufficient to gate on transistor 904, and start-up of the oscillator 116 via pin 7 of the UC3844 chip is not enabled. As a result, lamps which would otherwise illuminate without properly heated cathodes will not be illuminated, thereby preserving their lifetime and preventing premature failure.

Those skilled in the art will appreciate that in accordance with other exemplary embodiments, the exact circuitry can be modified to initiate an inhibiting of the oscillator 116 in response to poor or missing filament connections at any number of lamps. For example, in a three lamp configuration, it may be desirable to enable the oscillator when at least two of the three lamps have their filaments properly connected. However, in a two-lamp configuration, it may be desirable to enable the oscillator only when both lamps have filaments properly connected.

In summary, pin 7 of oscillator 116 is supplied at least one mA via transistor 904. In normal operation, the oscillator remains on for the predetermined start-up period (for example, the preheat interval of 1 second) due to the operation of the transistors 504 and 506 in the lamp current sensing device 134, which provides chip operating current. However, if a predetermined number of poor or missing lamp filament connections exist, transistor 904 is gated off, and the capacitor 902 will not charge to the 16 volt threshold necessary for chip start-up.

8. Dimming Circuit

As illustrated in the FIG. 2A schematic, a dimming circuit in accordance with an exemplary embodiment of the present invention includes means for summing a signal proportional to a current supplied to the load with a signal proportional to an external source, which can be produced in response to an external dimming command signal, to produce a dimming control signal. The drive signal providing means (such as the oscillator 116) is responsive to the dimming control signal to the drive signal output from oscillator 116. As power supplied to the load is reduced, lamp illumination is diminished such that a dimming effect can be achieved.

In accordance with an exemplary embodiment, a cost-effective dimming control feature can be achieved. Referring to FIG. 2B, the capacitor 502 of the lamp current sensing device 134 provides a voltage which is responsive to the lamp current. The voltage across capacitor 502 is supplied across the series connection of capacitor 2, resistor 10, and a resistor 12 of the dimming circuit, and thereby provides a voltage proportional to lamp current. Capacitor 2 provides DC blocking and differentiation, thus effecting a high-pass filter function, while resistor 10 is a scaling resistor.

When a dimming function is desired, a supplemental current is supplied via a transistor 4, from the power supply to a node 6 where it sums with current supplied through the capacitor 2. The transistor 4 can be operated in its linear region to is provide variable dim levels. The summed current is supplied via a diode 8 through resistor 9 to the capacitor 228 of the oscillator 116. A diode 11 of the dimming circuit resets the capacitor 14 of the dimming circuit when the energy control apparatus is in an off condition.

The increased current supplied to the timing capacitor 228 increases its charging rate and thereby increases the frequency of the drive signal output of oscillator 116. As mentioned previously in accordance with the exemplary FIG. 2 embodiment, this results in reduced power being supplied to the load and implements a dimming function.

Thus, exemplary embodiments of the present invention have been described in detail with respect to the circuit diagram of FIGS. 2A–2B. Those skilled in the art will readily appreciate the advantages of the present invention based on a review of the FIG. 1 block diagram. FIGS. 2A–2B have been included to provide enhanced detail with respect to various components of FIG. 1 and to illustrate an exemplary embodiment for each of the features described above. Many of the components in FIGS. 2A–2B have, although unnecessary, been described in detail. Specific components and component values which have not been described in detail can be readily selected by those skilled in the art. For example, many of the resistors are merely scaling resistors which can be selected by anyone familiar with conventional circuit design.

An alternate exemplary embodiment of the FIG. 1 system is illustrated in FIG. 5. Because the functions described with respect to the two lamp embodiment of FIG. 5 are, for the most part, identical to those described with respect to the three lamp embodiment of FIGS. 2A–2B, FIG. 5 need not be separately discussed in detail. Further, FIG. 5 illustrates many of the typical values which can be selected for use in conjunction with a system implemented in accordance with the present invention. However, those skilled in the art will appreciate that all values illustrated in FIG. 5 are by way of example only, and that anyone skilled in the art can readily modify the illustrated values to adapt any of the features described above to a specific application.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for controlling power supplied to a non-linear or negative-resistance load, the apparatus comprising:

means for providing an amplitude modulated DC power supply;

means for providing a control signal to control said supply of amplitude modulated DC power to the load, said control signal having a variable power content which is controlled by a voltage signal input of said control signal providing means; and means for adjusting the power content of said control signal, said adjusting means further including a primary current supply for establishing a rate of change of said voltage signal input, and a supplemental current supply which is selectively gated for increasing said rate of change of said voltage signal input to adjust said power content during a predetermined time period.

2. Apparatus according to claim 1, wherein said voltage signal input further includes:

a capacitor which is charged by said primary current supply and by said supplemental current supply during said predetermined time period, after which said capacitor is charged only by said primary current supply.

3. Apparatus according to claim 2, wherein said adjusting means further includes:

a second capacitor which is charged by said modulated DC power supply; and an adjustable gain switch which is gated both on and off by said second capacitor during a charging cycle of said second capacitor.

4. Apparatus according to claim 3, wherein said adjusting means further includes:

means for selecting said adjustable gain to establish a predetermined rate of change of the power content from a starting power content to an operating power content.

5. Apparatus for controlling power supplied to a non-linear or negative-resistance load, the apparatus comprising:

means for providing an amplitude modulated DC power supply;

means for providing a control signal to control said supply of amplitude modulated DC power to the load; and means, responsive to said current supplied to said load for producing a lamp current detection signal as an enable signal input to the control signal providing means.

6. Apparatus according to claim 5, wherein said means for producing a lamp current detection signal further includes:

a capacitor which is charged in response to lamp current; and a lamp control switch, responsive to charge across said capacitor, for providing said enable signal input.

7. Apparatus according to claim 6, further including:

a second capacitor which is charged by said modulated DC power supply; and an adjustable gain switch which is gated both on and off by said second capacitor during a charging cycle of said second capacitor to provide a supplemental current to said control signal providing means, a charge across said second capacitor also being supplied to said lamp control switch such that said lamp control switch remains on even after said adjustable gain switch has been gated off during a charging cycle of said second capacitor.

8. Apparatus for controlling power supplied to a non-linear or negative resistance load, the apparatus comprising:

means for providing an amplitude modulated DC power supply; and means for controlling said supply of amplitude modulated DC power to said load with first and second switches which are driven by first and second switching signals, respectively 180° out of phase with one another, said first and second switches establishing a dead band between switching off of said first switch and switching on of said second switch by establishing said first and second switching signals as pulses which have a decay time that is faster than a rise time of said pulses.

9. Apparatus according to claim 8, wherein said first and second switches include first and second transistors, respectively, said apparatus further including:

first and second capacitors connected to an input of said first and second transistors, respectively for establishing said pulses.

10. Apparatus for controlling energy supplied to a non-linear or negative-resistance load, the apparatus comprising:

means for providing an amplitude modulated DC power supply;

means for providing a control signal to control an inverter which supplies power from said supply of the amplitude modulated DC power to the load;

means responsive to said amplitude modulated DC supply for producing a high-voltage detection signal, said control signal providing means further including:

means for inhibiting said control signal when said high-voltage detection signal exceeds a predetermined threshold.

11. Apparatus according to claim 10, wherein said high voltage detection signal producing signal means further includes:

a voltage divider.

12. Apparatus for controlling power supplied to a non-linear or negative-resistance load, the apparatus comprising:

means for providing an amplitude modulated DC power supply;

means for providing a control signal to control an inverter which supplies power from said supply of the amplitude modulated DC power to the load; and means responsive to ambient temperature within said apparatus for providing a thermal detection signal, said control signal providing means further including:

means for inhibiting said control signal when said thermal detection signal exceeds a predetermined threshold.

13. Apparatus according to claim 12, wherein said thermal detection signal providing means further includes:

a plurality of non-linear devices electrically connected in series to said inhibiting means.

14. Apparatus for controlling energy supplied to a non-linear or negative-resistance load formed as a lamp having at least one filament for insertion into a socket, the apparatus comprising:

means for providing an amplitude modulated DC power supply;

means for providing a control signal to control said supply of the amplitude modulated DC power to the load; and means responsive to a level of current through said at least one filament to enable said control signal providing means.

15. Apparatus according to claim 14, wherein said enabling means further includes:

a switch which is responsive to current through said at least one filament for enabling said control signal providing means.

16. Apparatus for controlling power supplied to a non-linear or negative-resistance load formed as a lamp having at least one filament for insertion into a socket, the apparatus comprising:

means for providing an amplitude modulated DC power supply;

means for providing a control signal to control an inverter which supplies power from said supply of the amplitude modulated DC power to the load; and means for summing a current supplied to said load and a current proportional to an external current source to produce a dimming control signal, said control signal providing means being responsive to said dimming control signal to reduce power supplied to said load from said amplitude modulated DC power supply.

* * * * *